United States Patent Office 3,435,870
Patented Apr. 1, 1969

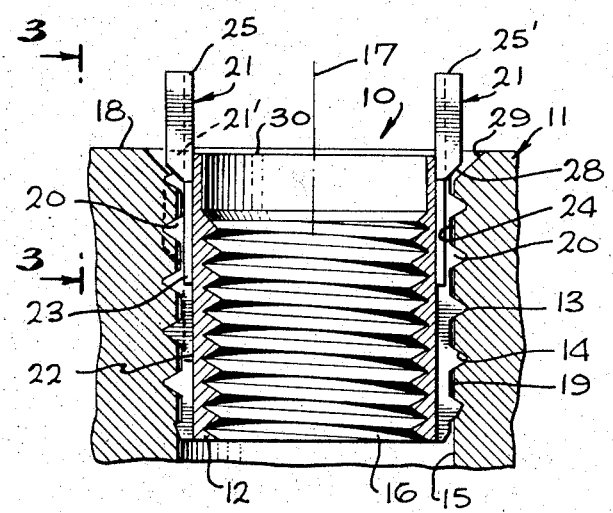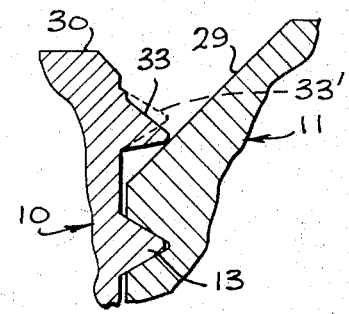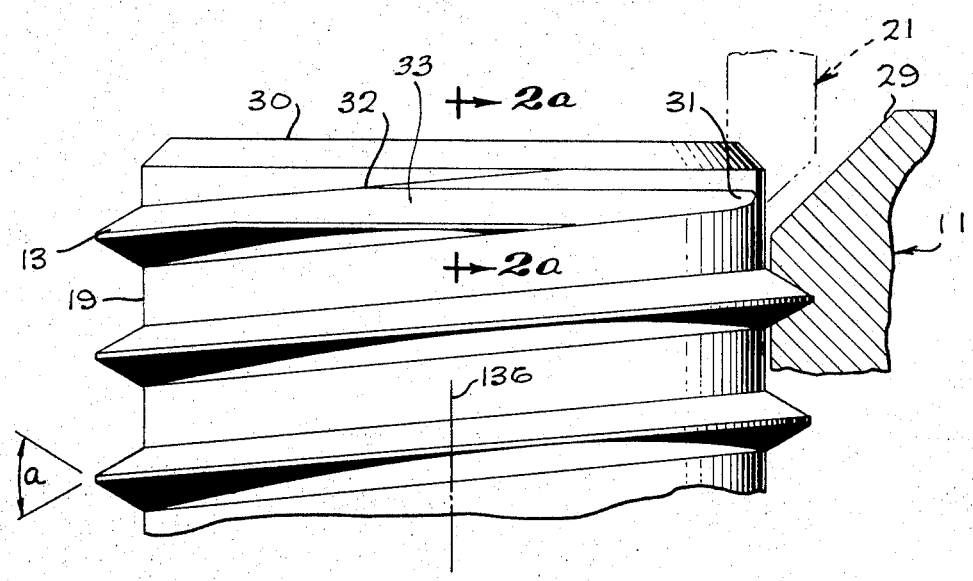

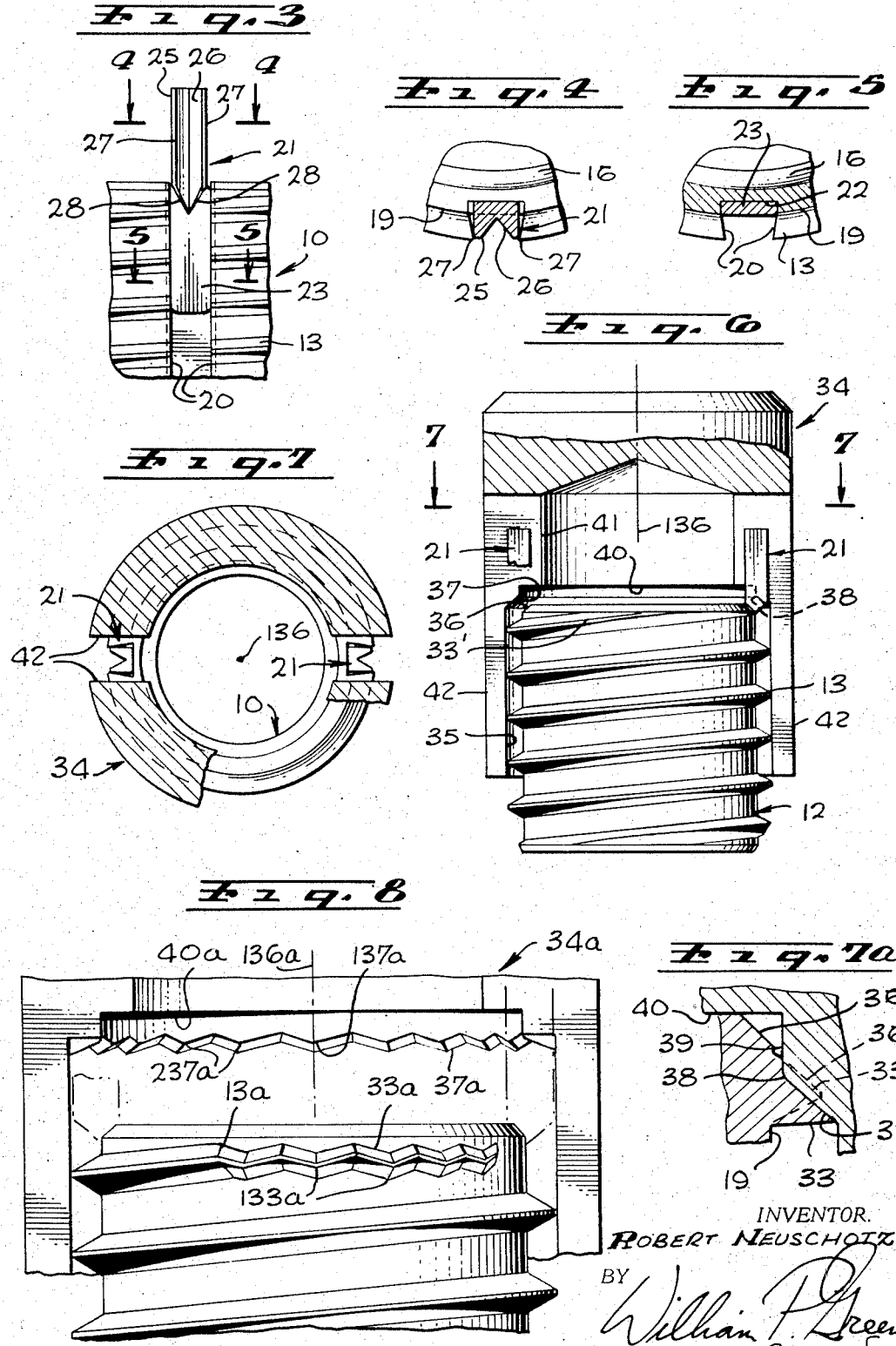

3,435,870
LOCK KEY FASTENER UTILIZING DEFORMED THREAD AS STOP SHOULDER
Robert Neuschotz, 1162 Angelo Drive,
Beverly Hills, Calif. 90210
Filed Dec. 6, 1967, Ser. No. 688,563
Int. Cl. F16b 39/284, 39/34
U.S. Cl. 151—22                                18 Claims

ABSTRACT OF THE DISCLOSURE

A fastener having an external thread to be screwed into a carrier part, and having another thread for connection to a coacting member, with the external thread having a portion at its axially outer end which is deformed or displaced axially to a position in which it will function as a stop shoulder, for engaging the carrier part in a relation limiting the extent to which the fastener can be screwed into that part.

Background of the invention

This invention relates to fasteners of a type having an external thread adapted to be screwed into a carrier part, and having a second thread which is connectible to another threaded element in a manner attaching that element to the carrier part through the medium of the fastener. The invention will be described as applied to threaded inserts, in which the second thread is an internal thread, though it will be understood that the invention is also applicable to stud arrangements in which both sets of threads are external.

In utilizing a threaded insert or other similar threaded fastener, it is frequently difficult to accurately predetermine the extent to which the insert can be screwed into a carrier part in use. Ordinarily, it is desirable to advance the insert or fastener into the carrier part to a position in which an axially outwardly facing end surface or shoulder on the fastener is approximately flush with the outer surface of the carrier part, or more specifically and preferably is slightly beneath such a precisely flush condition.

Summary of the invention

In a fastener formed in accordance with the present invention, I utilize a unique type of stop shoulder for accurately limiting the extent to which the fastener may be screwed into a carrier part, and thus predetermining the ultimate setting of the fastener. Specifically, this stop shoulder is formed by slightly axially deforming or displacing a portion of the external thread of the fastener, to a condition in which that portion of the thread will itself engage against the carrier part in a relation halting threaded advancement of the fastener into that part. In one form of the invention, the stop shoulder portion of the thread is displaced to a position in which its pitch is substantially reduced relative to the rest of the thread, desirably to a substantially zero pitch condition, that is one in which the thread does not advance axially as it advances circularly about the axis of the fastener. In another form of the invention, the deformed portion of the thread may be given an axially serrated configuration, to form a number of localized areas or points at which the deformed thread is engageable with a carrier part in motion limiting relation.

Brief description of the drawings

The above and other features and objects of the invention will be better understood from the following detailed description of the typical embodiments illustrated in the accompanying drawings, in which:

FIG. 1 is an axial section through a threaded insert constructed in accordance with the invention, shown positioned within a carrier part;

FIG. 2 is an enlarged elevational view of the upper portion of the FIG. 1 insert;

FIG. 2a is a section on line 2a–2a of FIG. 2;

FIG. 3 is taken on line 3—3 of FIG. 2;

FIGS. 4 and 5 are fragmentary transverse sections taken on lines 4—4 and 5—5 respectively of FIG. 3;

FIG. 6 shows the insert prior to axial displacement of a portion of the end turn, and also illustrates in axial section a tool which may be utilized for deforming the thread turn;

FIG. 7 is a section on line 7—7 of FIG. 6;

FIG. 7a is an enlarged fragmentary axial section through the deforming shoulder of the tool and a thread being deformed thereby; and FIG. 8 is a view similar to FIG. 6, but showing a variational form of the invention.

Description of the preferred embodiments

Referring first to FIG. 1, I have shown at 10 a threaded insert embodying the invention as it appears after installation within a carrier part 11. The insert 10 includes an essentially tubular preferably metal body 12 having an external thread 13 which is screwed into an internal thread 14 formed in a passage 15 in the carrier part. The insert body 12 also has an internal thread 16 which is engageable with a screw or stud in a relation connecting the latter to the carrier part 11 through the medium of insert 10. All of the threads 13, 14, and 16 are centered about a common axis 17, disposed perpendicular to the outer planar surface 18 of the carrier part.

External thread 13 of the insert body may be of standard cross sectional profile except that it is preferably provided with a modified minor diameter defining axially extending cylindrical surfaces 19 between successive turns of the thread and of a greater diameter and greater axial extent than if the thread were of completely standard form. The included angle $a$ (FIG. 2) between opposite side faces of the external thread 13 may be the usual 60 degree angle employed in standard threads. The internal thread 14 formed in carrier part 11 is of essentially the same configuration as external thread 13 on the insert body, and preferably terminates axially outwardly in an annular flaring frusto-conical countersink surface 29.

Extending along opposite sides of the insert body 12, there are provided two parallel axial grooves 20, which extend axially through and interrupt the external threads 13 at diametrically opposite locations, and which receive and retain two locking keys 21. Each of the grooves 20 has the dovetail cross sectional configuration illustrated in FIG. 5, to effectively retain and confine the associated key 21, and guide it for axial movement when the key is ultimately driven to its broken line locking position of FIG. 1. The inner wall 22 of each groove is desirably located radially inwardly beyond the minor diameter 19 of external thread 13.

Each of the keys 21 has an axially inner mounting portion 23 which is thin enough radially to be received within the radially innermost portion of the associated groove 20, at a location inwardly beyond the minor diameter portions 24 of the carrier part thread 14, so that the insert may be screwed to the FIG. 1 position in which mounting portion 23 of the key is received within the carrier part thread, and does not interfere in any way with such installation of the insert. Axially outwardly of its mounting portion 23, the key has a locking portion 25, of increased radial thickness, to project radially outwardly beyond the minor diameters of threads 13 and 14, so that when the key is driven from the full line position of FIG. 1 to the broken line position 21' (in which the outer end 25' of the key is essentially flush with the outer end of the insert body 12), portion 25 will cut through the threads of the carrier part in a manner locking the insert against unscrewing rotation. Preferably, portion 25 of the key contains an axially extending central groove 26 (FIG. 4), dividing the key into two spaced parallel cutting edges 27, which terminate downwardly in two converging and radially inwardly advancing edges 28 ultimately merging with the outer flat surface of portion 23 of the key. The engagement of mounting portion 23 of each key with the side walls of the coacting groove 20 is sufficiently tight to frictionally retain the keys in the FIGS. 1 and 3 full line positions relative to body 12 of the insert, until the keys are forcibly driven axially.

In the ultimate installed position of insert body 12, the outer annular end surface 30 of that body is desirably disposed slightly axially inwardly of the plane of outer surface 18 of the carrier part. To determine this ultimate setting of the insert relative to the carrier part, the upper or axially outer end turn of thread 13 of the insert body is deformed in a manner enabling it to serve as a stop shoulder, by engaging countersink surface 29 and halting advancement of the insert body into the carrier part in the FIG. 1 position. More particularly, FIGS. 2 and 2a illustrate the manner in which the end portion 33 of this upper turn is displaced axially downwardly to a position in which it no longer forms a true helical continuation of the rest of the thread 13. Desirably, this downward or axially inward deformation of the end of the uppermost turn of thread 13 continues through at least about one-fifth of a turn of the thread about axis 17, and for best results not more than about one-half of a turn of the thread, though in its broadest aspects the invention is of course not limited to this range.

In FIG. 2, the extremity of the upper turn of thread 13 is at approximately the location designated by the numeral 31. In advancing circularly from this extremity (to the left in FIG. 2), the upper turn of the thread gradually increases in cross sectional area, until it ultimately reaches the full cross sectional profile of the rest of the turns. Desirably, the deformed portion (say from point 31 to a point near location 32 in FIG. 2) extends at a pitch which is greatly reduced as compared with the helical pitch of the rest of the turns of thread 13, with the pitch between locations 31 and 32 preferably being substantially zero. That is, the deformed portion between locations 31 and 32 preferably does not advance axially as it advances circularly about axis 17. FIG. 2a shows the manner in which the undersurface of this downwardly displaced or deformed portion 33 of the upper turn of thread 13 engages the countersink to limit the advancement of the insert body into the carrier part. In this ultimate installed position of the insert body, the lowermost extremities or edges 28 of locking portions 26 of the keys are desirably spaced slightly above countersink surface 29, to avoid contact with that surface, and enable the deformed portion of the thread to function alone as the shoulder for halting the installing movement of the insert.

With reference now to FIG. 6, I have shown at 34 a tool which may be utilized for deforming the extremity 33 of thread 13 to the condition of FIGS. 2 and 2a. This tool 34 may be externally cylindrical, and contain a downwardly opening cylindrical recess 35 centered about the vertical axis 136 of the tool and dimensioned to receive and closely confine insert body 12, with keys 21 already attached thereto. When the insert body 12 is first inserted into recess 35 of tool 34, the thread 13 does not as yet have its uppermost turn deformed, but instead that turn is in its initially formed condition in which it defines a true helical continuation of the rest of the thread, continuing at the same helical pitch as do the lower turns. This upper end portion of thread 13 which ultimately forms portion 33 of FIG. 2 is designated 33' in its original FIG. 6 condition. In this condition, it may be assumed that the upper end of insert body 12 has been externally chamfered, to form an upwardly tapering frusto-conical chamfer surface 36 on the body and on the upper portion of thread 13, including particularly the portion 33' which is to ultimately be deformed. Thus, this chamfer progressively reduces the cross section of the upper turn of the thread, and especially portion 33', as that turn advances circularly to its extremity 31.

At the upper end of the cylindrical recess 35, there is formed in the rigid body of tool 34 an annular downwardly facing shoulder 37, which is centered about axis 136 and is preferably disposed at a downwardly flaring angle as shown, or may alternatively be disposed directly transversely of axis 136. The inner circular edge 38 of shoulder 37 (FIGS. 6 and 7a) has a diameter close to, but preferably slightly greater than, the diameter of minor diameter surfaces 19 on the outside of the insert body 12. Extending upwardly from this edge 38, there may be a short cylindrical surface 39 of the same diameter, at the upper end of which there may be provided an inwardly extending transverse annular shoulder 40 which is axially opposite upper end surface 30 of the insert body, and is engageable therewith to limit the downward motion of tool 34 relative to the insert. If preferred, the extent of deformation may of course be controlled in other ways. Above the level of and radially inwardly of shoulder 40, the tool may contain a central circular recess 41. Extending along its opposite sides, the tool 34 may contain two diametrically opposed axially extending slits 42 forming recesses within which keys 21 are receivable, as will be apparent from FIGS. 6 and 7.

In using the tool of FIGS. 6 and 7, an operator first moves insert body 12 upwardly into recess 35, and then drives body 34 of the tool downwardly relative to the insert until shoulder 40 engages the upper end surface 30 of the insert body, so that the shoulder 37 engages the end portion 33' of the upper turn of thread 13, to displace it axially downwardly from the position of FIG. 6 to the position of FIG. 2. FIG. 7a shows this deformation in greatly enlarged form, with the initial condition of the thread being shown in broken lines, and the ultimate deformed condition shown in full lines. Attention is also called to the fact that in FIG. 7a the portion of the thread there shown is near enough to the end of the thread that its outer extremity is chamfered at 36'. The shoulders 37 and 40 lie in planes which are spaced axially apart far enough to enable exactly a desired amount of deformation of the end portion of thread 13, to attain the results discussed above.

In installing the insert of FIGS. 1 to 5, a user merely screws the insert downwardly into carrier part 11 to the position of FIG. 1, and until the deformed portion 33 of the upper turn of thread 13 engages countersink surface 29 to limit the advancement of the insert into the carrier part at the FIG. 1 position. Keys 21 are then driven downwardly to cut through the threads of the carrier part and lock the insert against unscrewing rotation.

FIG. 8 is a view similar to FIG. 6, but showing a variational form of the invention in which the end portion 33a of thread 13a is deformed to a serrated condition, rather than to the transverse zero-pitch condition of FIG. 2. To attain this result, the tool 34a, corresponding to tool 34 of FIG. 6, has a deforming shoulder 37a which is shaped to form axially projecting serrations or teeth 137a, having lowermost edges 237a which may be inclined as shown (or which may extend directly transversely of axis 136a if preferred). These serrations 137a may be provided at spaced locations entirely about axis 136a, to appropriately deform the upper extremity of thread 13a regardless of where that extremity may occur about the axis. When the tool 34a is driven downwardly, it forms similarly shaped axial serrations in portion 33a of thread 13a, defining the lowermost edges 133a which are engageable with countersink surface 29 of the carrier part to limit the extent to which the insert may be screwed into the carrier part. As in the first of the invention, a transverse shoulder 40a may be provided on the tool body for engagement with the insert in a relation determining the extent to which the thread turn is deformed axially.

It is contemplated that in both forms of the invention, the chamfer 36 at the upper end of the insert may be omitted if desired, with the thread then continuing upwardly to the top of the insert in completely unchamfered condition.

I claim:

1. The combination comprising a carrier part having an outer surface and having a passage extending into the material of the carrier part from said outer surface, a fastener having an external thread to be screwed into said passage and having a second thread to be engaged by a coacting member to secure said member to the carrier part through the medium of the fastener, said fastener having an axially outwardly facing surface at the axially outer end of said external thread, and said external thread having a portion thereof near its axially outer end which, prior to installation of the fastener in the carrier part, is deformed to a condition forming a stop shoulder adapted to engage the carrier part and positively halt threaded advancement of the fastener into the passage at a position in which said outwardly facing surface of the fastener is substantially flush with or slightly inwardly of said outer surface of the carrier part, said carrier part having a surface which is offset axially inwardly of said outer surface of the carrier part and which is engaged by said deformed portion of the external thread to halt said advancement of the fastener at said position, said fastener having at least one groove extending generally through and interrupting at least a portion of said external thread, and a locking key received in fixed position in said groove in a position of projection axially outwardly beyond said axially outwardly facing surface on the fastener and adapted to be driven generally axially within the groove to a locking position generally flush with said outwardly facing surface.

2. The combination as recited in claim 1, in which said deformed porton of the external thread is displaced generally axially from the position which it would assume if it were a true helical continuation of the remainder of the thread.

3. The combination as recited in claim 1, in which said deformed portion of the external thread is displaced to a position in which, as it advances circularly, it advances more directly transversely of the axis of the external thread than does the remainder of said thread.

4. The combination as recited in claim 1, in which said deformed portion of the external thread is serrated generally axially in a relation forming a plurality of axially displaced regions spaced circularly about the thread axis.

5. The combination as recited in claim 1, in which said deformed portion of the external thread is at essentially the end of the axially outermost turn thereof and has a circular extent of not substantially more than about one-half of a turn of the external thread.

6. The combination comprising a carrier part having an outer surface and having a passage extending into the material of the carrier part from said outer surface, a fastener having an external thread to be screwed into said passage and having a second thread to be engaged by a coacting member to secure said member to the carrier part through the medium of the fastener, said fastener having an axially outwardly facing surface at the axially outer end of said external thread, and said external thread having a portion thereof near its axially outer end which, prior to installation of the fastener in the carrier part, is deformed to a condition in which opposite sides of said thread portion are both displaced toward a predetermined common end of the fastener from the positions they would assume if undeformed, and in which said thread portion forms a stop shoulder adapted to engage the carrier part and positively halt threaded advancement of the fastener into the passage at a predetermined position in which said outwardly facing surface of the fastener is substantially flush with or slightly inwardly of said outer surface of the carrier part, said carrier part having a surface which is offset axially inwardly of said outer surface of the carrier part and which is engaged by said deformed portion of the external thread to halt said advancement of the fastener at said predetermined position, said fastener having at least one groove extending generally through and interrupting at least a portion of said external thread, and a locking key received in fixed position in said groove in a position of projection axially outwardly beyond said axially outwardly facing surface on the fastener and adapted to be driven generally axially within the groove to a locking position generally flush with said outwardly facing surface.

7. The combination as recited in claim 6, in which said inwardly offset surface of the carrier part is a tapering countersink surface extending axially inwardly from said outer surface of the carrier part and is engaged by one of said displaced sides of said deformed thread portion to halt said advancement of the fastener at said predetermined position thereof.

8. The combination as recited in claim 6, in which said opposite sides of said thread portion are both displaced toward the axially inner end of the fastener.

9. The combination as recited in claim 6, in which said opposite sides of said thread portion are both displaced toward the axially inner end of the fastener, said deformed thread portion having a first surface at an axially outer one of said sides which, as viewed in axial section, is disposed at essentially an oblique flaring angle with respect to the axis of the fastener, and having a second surface at the opposite axially inner side of said portion which, as viewed in axial section, is disposed more directly transversely of said axis.

10. The combination as recited in claim 6, in which said deformed portion of the external thread is displaced to a position in which, as it advances circularly, it advances more directly transversely of the axis of the external thread than does the remainder of said thread, said portion of the thread having a surface of substantial circular extent which is of essentially zero pitch angle.

11. The combination as recited in claim 6, in which said deformed portion of the external thread is serrated generally axially in a relation forming a plurality of axially displaced regions spaced circularly about the thread axis, said deformed portion having surfaces of generally axially serrated configurations at both of said sides thereof.

12. The combination as recited in claim 6, in which said key has an axially inner mounting portion received in the groove and a radially thicker locking portion projecting axially outwardly and adapted to cut through the material of the carrier part when the key is driven axially, said locking portion of the key being so constructed that it does not engage the carrier part in a relation halting advancement of said fastener into the carrier part prior to engagement of said deformed portion of the external thread with the carrier part.

13. The combination as recited in claim 6, in which said second thread of the fastener is an internal thread, and said outwardly facing surface is located at and defines the axially outermost extremity of the fastener.

14. A fastener comprising a body to be installed within a carrier part of predetermined configuration having an outer surface and a passage extending into the carrier part from said outer surface, said body having an external thread to be screwed into said passage and said body carrying a second thread to be engaged by a coacting member to secure said member to the carrier part through the medium of the body, said body having an axially outwardly facing surface at the axially outer end of said external thread, and said external thread having a portion thereof at its axially outer end which, prior to installation of said body in the carrier part, is deformed to a condition in which opposite sides of said thread portion are both displaced toward the axially inner end of said body from the positions they would assume if undeformed, and in which said thread portion forms a stop shoulder adapted to engage the carrier part and positively halt threaded advancement of said body into the passage at a predetermined position in which said outwardly facing surface of the body is substantially flush with or slightly inwardly of said outer surface of the carrier part, said deformed portion of the external thread being confined entirely to the axially outermost turn thereof, said body having at least one groove extending generally through and interrupting at least a portion of said external thread, and a locking key received in fixed position in said groove in a position of projection axially outwardly beyond said axially outwardly facing surface on the body and adapted to be given generally axially within the groove to a locking position generally flush with said outwardly facing surface.

15. A fastener as recited in claim 14, in which said deformed portion of the external thread is displaced to a position in which, as it advances circularly, it advances more directly transversely of the axis of the external thread than does the remainder of said thread, and has essentially a zero pitch angle through a substantial circular distance adjacent the axially outermost extremity of the external thread.

16. A fastener as recited in claim 14, in which said deformed portion of the external thread is serrated generally axially in a relation forming a plurality of axially displaced regions spaced circularly about the thread axis.

17. A fastener as recited in claim 14, in which said deformed portion of the external thread is serrated in a relation forming a plurality of circularly spaced serrations some of which are deformed axially farther than others so that the successive serrations do not advance helically relative to one another at a pitch angle as great as that of the remainder of the thread.

18. A fastener as recited in claim 14, in which said key has an axially inner mounting portion received in the groove and a radially thicker locking portion projecting axially outwardly and adapted to cut through the material of the carrier part when the key is driven axially, said locking portion of the key being so constructed that it does not engage the carrier part in a relation halting advancement of said body into the carrier part prior to engagement of said deformed portion of the external thread with the carrier part, said second thread being an internal thread, and said outwardly facing surface being located at and defining the axially outermost extremity of said body.

References Cited

UNITED STATES PATENTS

| | | | |
|---|---|---|---|
| 1,849,240 | 3/1932 | McCrudden | 151—22 |
| 2,135,637 | 11/1938 | Gade | 151—22 |
| 2,177,003 | 10/1939 | Purtell | 151—22 |
| 2,750,979 | 6/1956 | Jewett. | |
| 2,791,787 | 5/1957 | Neuschotz. | |
| 2,855,970 | 10/1958 | Neuschotz | 151—23 |
| 3,023,797 | 3/1962 | Greene. | |
| 3,105,535 | 10/1963 | Czarnowski | 151—23 |
| 3,270,792 | 9/1966 | Neuschotz et al. | 151—23 |

FOREIGN PATENTS

| | | |
|---|---|---|
| 716,817 | 8/1965 | Canada. |
| 837,038 | 6/1960 | Great Britain. |

MARION PARSONS, JR., *Primary Examiner.*

U.S. Cl. X.R.

151—23